(12) United States Patent
Obrador et al.

(10) Patent No.: US 7,848,577 B2
(45) Date of Patent: Dec. 7, 2010

(54) IMAGE PROCESSING METHODS, IMAGE MANAGEMENT SYSTEMS, AND ARTICLES OF MANUFACTURE

(75) Inventors: Pere Obrador, Mountain View, CA (US); Nathan M. Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1167 days.

(21) Appl. No.: 11/495,846

(22) Filed: Jul. 27, 2006

(65) Prior Publication Data

US 2008/0025629 A1    Jan. 31, 2008

(51) Int. Cl.
G06K 9/68 (2006.01)
G06K 9/00 (2006.01)
H04N 11/20 (2006.01)
H04N 7/01 (2006.01)
G09G 5/02 (2006.01)

(52) U.S. Cl. .................. 382/218; 382/162; 345/589; 348/453

(58) Field of Classification Search .................. None
See application file for complete search history.

(56) References Cited

U.S. PATENT DOCUMENTS

| | | | |
|---|---|---|---|
| 5,943,059 A * | 8/1999 | Satoh et al. | 345/601 |
| 6,360,008 B1 * | 3/2002 | Suzuki et al. | 382/167 |
| 6,469,706 B1 * | 10/2002 | Syeda-Mahmood | 345/589 |
| 6,477,272 B1 * | 11/2002 | Krumm et al. | 382/170 |
| 6,741,800 B2 | 5/2004 | Ko et al. | |
| 6,792,141 B2 | 9/2004 | Huniu | |
| 7,415,153 B2 * | 8/2008 | Mojsilovic | 382/162 |
| 2003/0108237 A1 * | 6/2003 | Hirata | 382/164 |
| 2005/0052665 A1 | 3/2005 | Moroney | |
| 2005/0135559 A1 * | 6/2005 | Hermann Claus | 378/91 |
| 2006/0087517 A1 * | 4/2006 | Mojsilovic | 345/593 |
| 2006/0210170 A1 * | 9/2006 | Yumoto et al. | 382/219 |

OTHER PUBLICATIONS

"Unconstrained web-based color naming experiment"; Moroney, Nathan; Color imaing: Device-Independent Color, Color Hardcopy, and Graphic Arts VIII; proc. of SPIE; 2003; 11 pp.

U.S. Appl. No. 11/259,597, filed Oct. 25, 2005; entitled "An Adaptive Lexical Classification System"; Moroney, Nathan.

"Image Management Methods, Image Management Systems, and Articles of Manufacture"; Obrador et al.; filed same day.

* cited by examiner

*Primary Examiner*—Anand Bhatnagar
*Assistant Examiner*—Randolph Chu

(57) ABSTRACT

Image processing methods, image management systems, and articles of manufacture are described. According to one embodiment, an image processing method includes accessing image data of a plurality of images, defining a plurality of regions in individual ones of the images, wherein the regions individually comprise a plurality of image forming elements having a common characteristic, comparing a region of one of the images with respect to regions of a plurality of others of the images, and providing information indicative of similarities of the one image relative to the others of the images using results of the comparing.

22 Claims, 5 Drawing Sheets

IMAGE PROCESSING METHODS, IMAGE MANAGEMENT SYSTEMS, AND ARTICLES OF MANUFACTURE

FIELD OF THE DISCLOSURE

Aspects of the disclosure relate to, image processing methods, image management systems, and articles of manufacture.

BACKGROUND OF THE DISCLOSURE

Colors are visual attributes resulting from responses to light waves of different frequencies impinging upon the human eye. The perception of color results from the combined output of three sets of retinal cones having peak sensitivities in the red, green and blue portions of the electromagnetic spectrum. Different levels of stimulus to the different sets of retinal cones gives rise to the ability of humans to perceive a large range of colors.

Conventional approaches to describing colors have included systems based on color encodings which represent components of a color in terms of positions or coordinates in a multidimensional color space. Colors may be mathematically represented using numerical data indicative of the position or coordinates in the color space. Although data regarding a color may specifically define a color with respect to the color space, these representations typically do not intuitively covey information regarding the color to humans.

At least some aspects of the disclosure provide methods and apparatus for performing operations with respect to images using words of a human readable lexicon and which are descriptive in human understandable terms of characteristics, such as color, of the images.

SUMMARY

According to some aspects of the disclosure, image processing methods, image management systems, and articles of manufacture are described.

According to one aspect, an image processing method comprises accessing image data of a plurality of images, defining a plurality of regions in individual ones of the images, wherein the regions individually comprise a plurality of image forming elements having a common characteristic, comparing a region of one of the images with respect to regions of a plurality of others of the images, and providing information indicative of similarities of the one image relative to the others of the images using results of the comparing.

According to another aspect, an image management system comprises storage circuitry configured to store a plurality of images and to store information regarding a plurality of regions of content of respective ones of the stored images, wherein the information is associated with respective ones of the images, and processing circuitry coupled with the storage circuitry and configured to access search criteria defining a region of a desired image to be located and to identify one of the stored images from an other of the stored images using the search criteria and the information regarding the regions of the stored images.

According to still another aspect, an article of manufacture comprises media comprising programming configured to cause processing circuitry to perform processing comprising accessing image data of an image, lexically quantizing the image data of the image, after the lexically quantizing, processing the image data to define a plurality of regions, wherein some of a plurality of image forming elements of an individual one of the regions comprises a common characteristic, and for the one of the regions, changing others of the image forming elements to comprise the common characteristic.

Other embodiments and aspects are described as is apparent from the following discussion.

DETAILED DESCRIPTION

At least some aspects of the disclosure describe morphological processing of images to identify regions of images having consistent characteristics. According to additional aspects, the identification of regions in processed images assists with management of images, including locating and retrieving desired images from a plurality of images (e.g., still images, frames of video content), for example stored in a database. In one embodiment, the morphological processing may be utilized in combination with lexical quantization processing described in a co-pending U.S. patent application entitled "An Adaptive Lexical Classification System", having U.S. patent application Ser. No. 11/259,597, filed Oct. 25, 2005, naming Nathan M. Moroney as inventor (the "'597 application"); and a co-pending U.S. patent application entitled "Image Management Methods, Image Management Systems, And Articles Of Manufacture", filed the same day as the present application, naming Pere Obrador and Nathan M. Moroney as inventors, the teachings of both of which are incorporated herein by reference.

Figure 1:
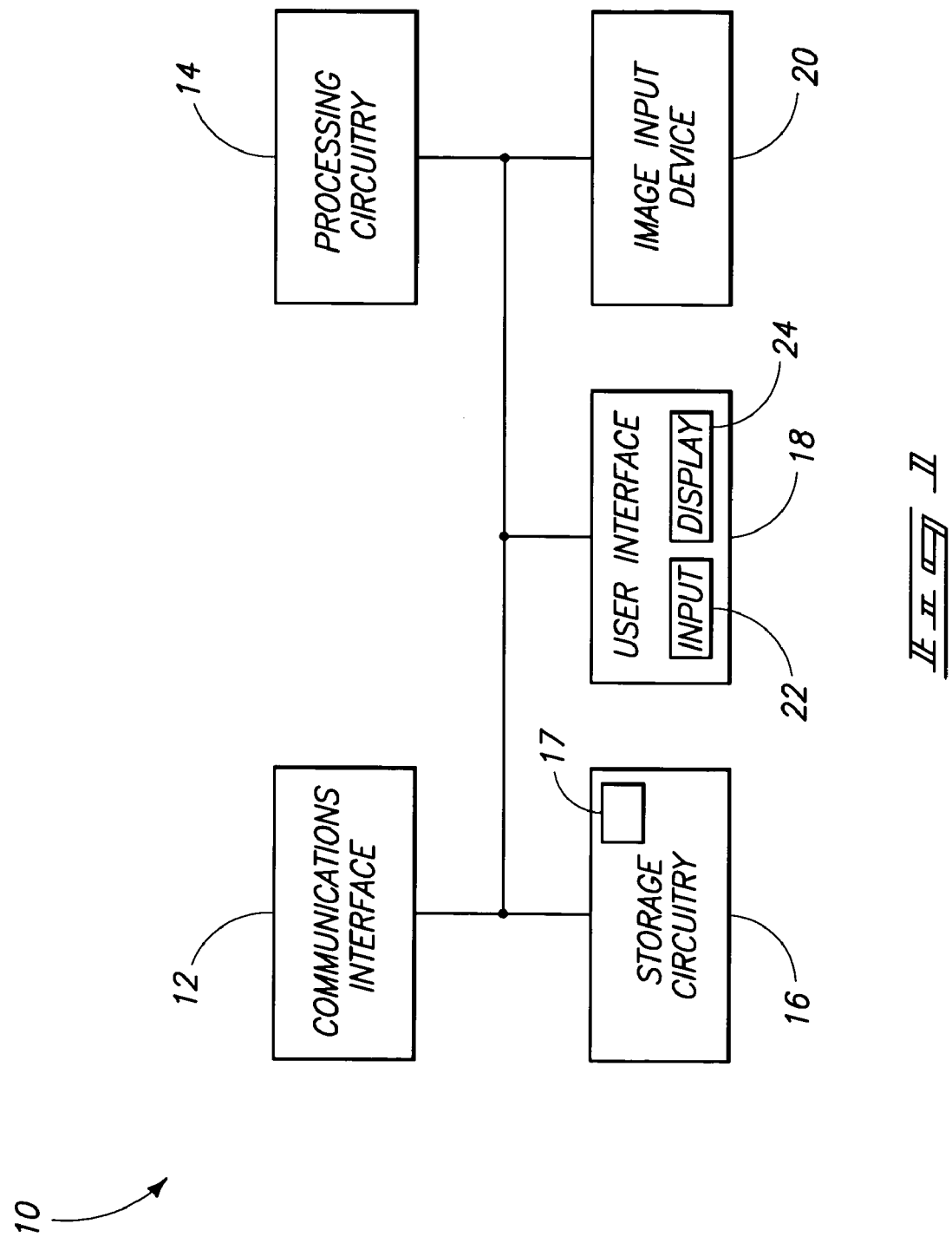
FIG. 1 is a functional block diagram of an image management device according to one embodiment.

Referring to FIG. 1, an exemplary image management system 10 is depicted according to one embodiment. The illustrated image management system 10 includes a communications interface 12, processing circuitry 14, storage circuitry 16, a user interface 18 and an image input device 20 according to the depicted embodiment. Other arrangements of system 10 are possible including more, less and/or alternative components.

Communications interface 12 is arranged to implement communications of computing device 10 with respect to external devices not shown. For example, communications interface 12 may be arranged to communicate information bi-directionally with respect to computing device 10. Communications interface 12 may be implemented as a network interface card (NIC), serial or parallel connection, USB port, Firewire interface, flash memory interface, floppy disk drive, or any other suitable arrangement for communicating with respect to computing device 10.

In one embodiment, processing circuitry 14 is arranged to process data, control data access and storage, issue commands, and control other desired operations. Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data, image data, meta data associated with image data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry 16 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or other transmission media and configured to control appropriate processing circuitry. For example, programming may be provided via appropriate media including, for example, embodied within articles of manufacture 17, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

User interface 18 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display 24 (e.g., cathode ray tube, LCD, etc.) configured to depict visual information and as well as a keyboard, mouse and/or other input device 22. Any other suitable apparatus for interacting with a user may also be utilized.

Image input device 20 may be implemented as any suitable device configured to provide electronic image data corresponding to an image, such as a photograph, provided to system 10. Scanning device 20 may be a flatbed color photograph scanner or digital camera in exemplary implementations.

According to one embodiment, image data (e.g., RGB, Lab) of a plurality of image forming elements (e.g., pixels) may be morphologically processed to identify regions of images having a consistent or common characteristic (e.g., contiguous body of image forming elements having a common color). In general, robustness of management of images including locating and retrieving images is increased (e.g., search results including erroneous images is reduced) through utilization of morphological processing. As described in further detail below, morphological processing may be performed upon images which have been lexically quantized. Lexical quantization uses human comprehensible words of a human readable lexicon (e.g., words of the English language or other languages) to describe visual characteristics of content of an image. The human comprehensible words may be associated with the image data and be used to assist with and/or facilitate management of images. In one exemplary embodiment, the human comprehensible words may describe characteristics (e.g., colors, grey scaling) of contents of the images in natural language, readily understood words to average humans in one embodiment. For example, the human comprehensible words may include lexical color names present within a human readable and comprehensible lexicon (e.g., content readily read and understood by humans as part of human language as distinguished from machine language or code which may also be understood by programmers but typically requires some type of mapping or understanding of mathematical relationships to color). Some exemplary lexical color names readily recognizable to humans include black, red, green, blue, black, magenta, and others.

As described in the '597 application, lexical color names corresponding to quantization bins may be generated by an aggregation of definitions of a relatively large population of humans. Accordingly, in some embodiments, words describe ranges of frequencies of the electromagnetic visible spectrum and which are readily understood words of the human lexicon as distinguished from technical terms for identifying the electromagnetic energy and perhaps only familiar to technical persons educated with respect to such technical terms in at least one implementation. Words may refer to any meaning bearing sequences of symbols of a lexicon, and may include abbreviations and lemmas as examples.

In one embodiment directed to color, the number of categories or bins for lexical quantization is determined according to the number of color names used to characterize images. Once images are lexically quantized, words indicative of content of the images (e.g., lexical color names) are associated with image forming elements of the images. Additional details of lexical quantization are discussed in detail below and in the patent applications incorporated by reference above.

According to one embodiment, morphological processing described herein may be performed upon an image which has been lexically quantized as mentioned previously (i.e., an appropriate one of the lexical color names is associated with each of the image forming elements of the image corresponding to the color contents of the image forming elements). The morphological processing identifies plural regions of the images having a consistent or common characteristic. In a more specific example, regions of the image are identified and one of the lexical color names is associated with each of the regions and corresponding to the color of the respective region. Morphological processing may include filtering of image forming elements of a given region which do not have the common characteristic and to change the content of such elements to the common characteristic. The filtering may be provided in different resolutions discussed below.

Information regarding the resultant regions may be associated with the initial image data (e.g., image data of the images before lexical quantization and morphological processing and useable to reproduce faithful reproductions of the images) of the images, and stored for example, as metadata of the images using storage circuitry 16. Metadata may be used to identify and retrieve desired initial image data of respective images in one embodiment. Exemplary information regarding the regions, which may be referred to as region information, may include a lexical color name indicative of the color of the image forming elements of the region. The region information may additionally include mass information (e.g., the quantity of image forming elements of the regions in number of pixels or a percentage to the total) as well as location information of the region. The location information may identify a centroid of the respective region corresponding to the average x and y locations of all image forming elements of the region in one exemplary embodiment.

Figure 2:
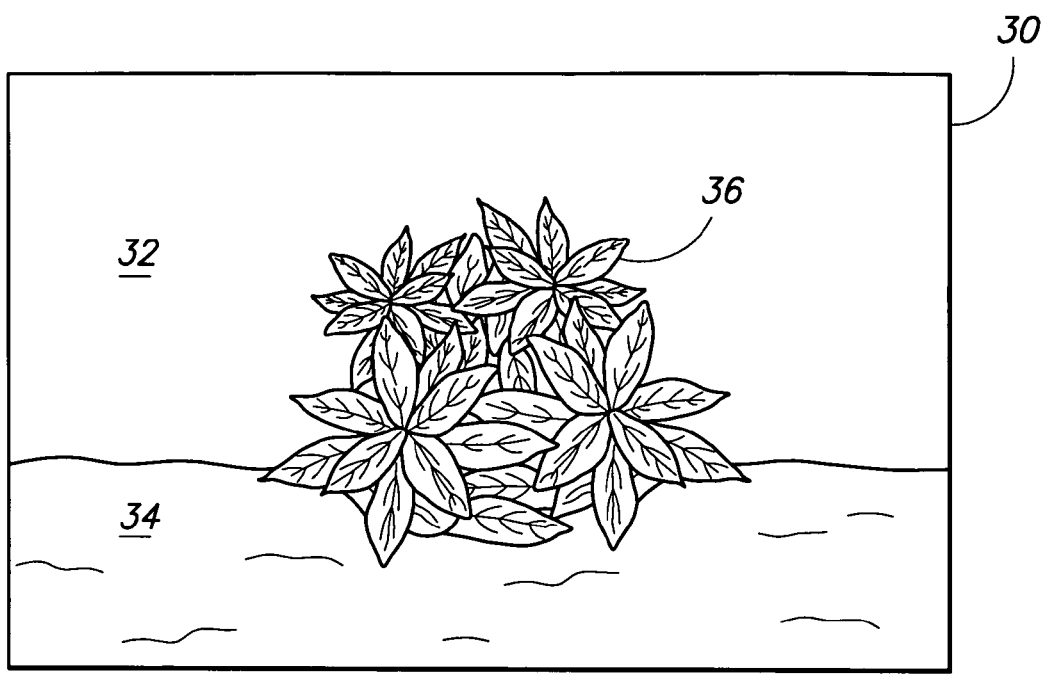
FIG. 2A are illustrative representations of images according to one embodiment.
Figure 2A:
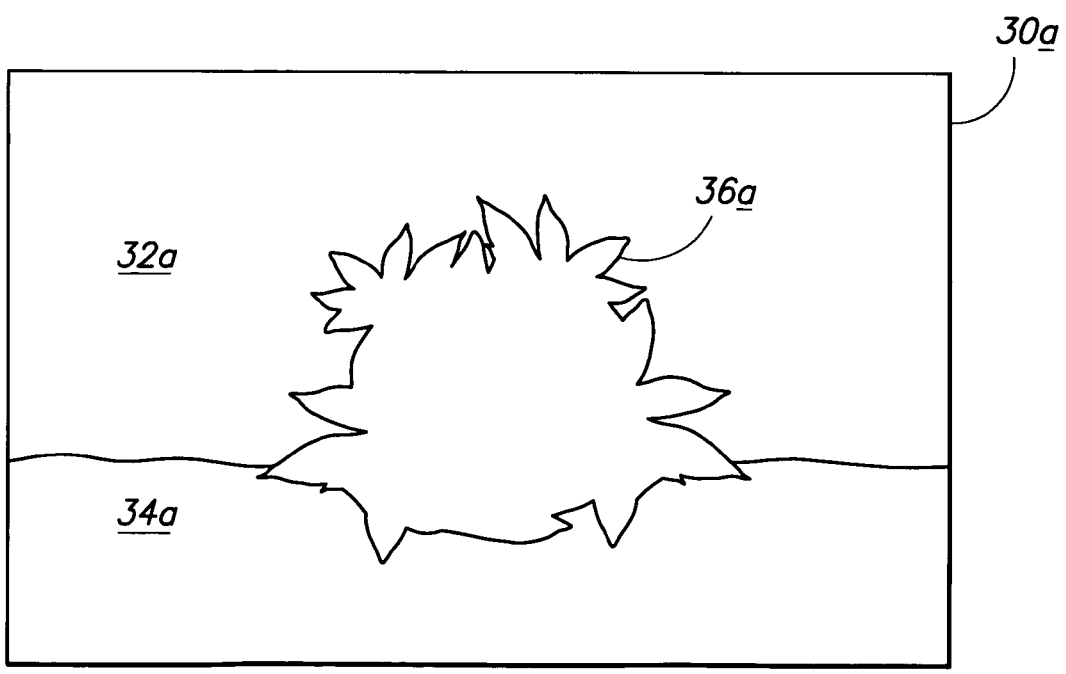

Referring to FIGS. 2-2A, exemplary images are shown including an original image 30 and a lexically-morphologically processed image 30a in one embodiment. The depicted image 30a is a segmented image generated using a lexical-morphological processing method according to one embodiment and discussed in further detail below. Other methods for segmenting images (e.g., generating multiple segments of an image and each of the segments being assigned a single color) may be used in other embodiments. The exemplary original image 30 of FIG. 2 includes a sky portion 32, ground portion 34, and a plant portion 36. Following processing of the image data of the original image, the processed image 30a of FIG. 2A includes a sky region 32a, ground region 34a, and plant region 36a. While the respective portions 32, 34, 36 may include different shades of respective colors, the regions 32a, 34a, 36a are generally featureless regions corresponding to the shapes of portions 32, 34, 36 and individually having a consistent color responsive to lexical quantization and morphological processing described below. The processing of the image data to define regions for the respective images allows searching of images stored in a data base using exemplary text search criteria identifying features of images (e.g., an exemplary search criteria may be "Locate images where an upper half of the image is blue") or by providing search images which may be processed in attempts to locate stored images in a data base which are similar to the search images.

Figure 3:
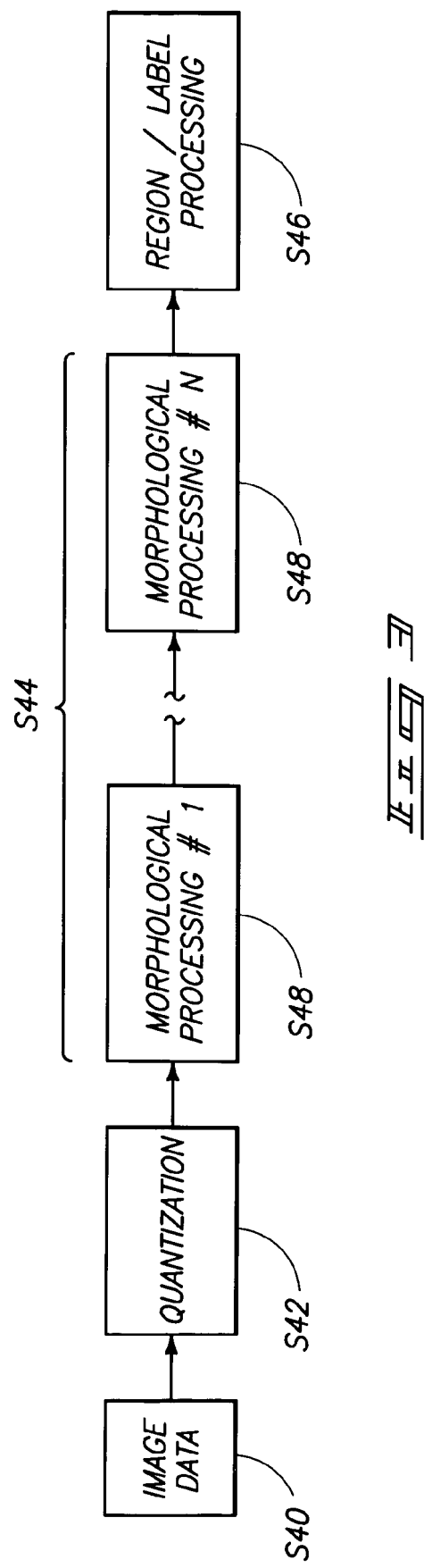
FIG. 3 is a flow diagram of an exemplary image processing method according to one embodiment.

Referring to FIG. 3, an exemplary method of identifying regions and associating human comprehensible words indicative of characteristics of the regions with the regions is described. The exemplary method may be performed using processing circuitry 14 in one embodiment. Other methods may include more, less and/or alternative steps in other embodiments.

At a step s40, image data of an image to be processed is accessed. The image data may be RGB data for a plurality of image forming elements (e.g., pixels) in one embodiment. The processing circuitry may operate to convert the image data to a desired color space, such as Lab, in one embodiment.

At a step S42, the processing circuitry quantizes the image data. In one embodiment, lexical quantization is performed, for example, using lexical quantization aspects described in the above-incorporated '597 application and the application filed the same day as the present application. At step S42, individual image forming elements of a lexically quantized image are associated with one of a plurality of lexical color names in the described exemplary embodiment with respect to color. Lexical quantization allows for a discrete outcome permitting filtering of non-consistent colors within a color patch or region as described below.

Morphological processing of the quantized image is performed at a step S44. The exemplary morphological processing of step S44 may include one or more levels corresponding to steps S48 which may implement morphological processing (filtering) at different resolutions. Additional details of processing of plural stages in one exemplary embodiment are discussed in Obrador, Pere, "Multiresolution Color Patch Extraction," published in SPIE Visual Communications and Image Processing, Jan. 15-19, 2006, San Jose, Calif., the teachings of which are incorporated herein by reference, and with respect to FIGS. 4-5 below. The output of processing of step S44 identifies a plurality of regions of an image individually having a common characteristic, such as a consistent color corresponding to one of the lexical color names of the lexical quantization.

At a step S46, the processing circuitry may perform region/label processing wherein the regions are labeled using lexical color names according to the consistent colors of the respective regions. In addition, some regions identified by the morphological processing of step S44 may be merged if appropriate. For example, a plurality of regions may be identified as corresponding to a single portion or object of an original image (e.g., due to a color gradient occurring in the portion or object causing the lexical quantization of the portion or object to be classified into plural regions). As discussed in further detail below according to one embodiment, the processing circuitry may combine plural regions into a single region if appropriate criteria are met.

Figure 4:
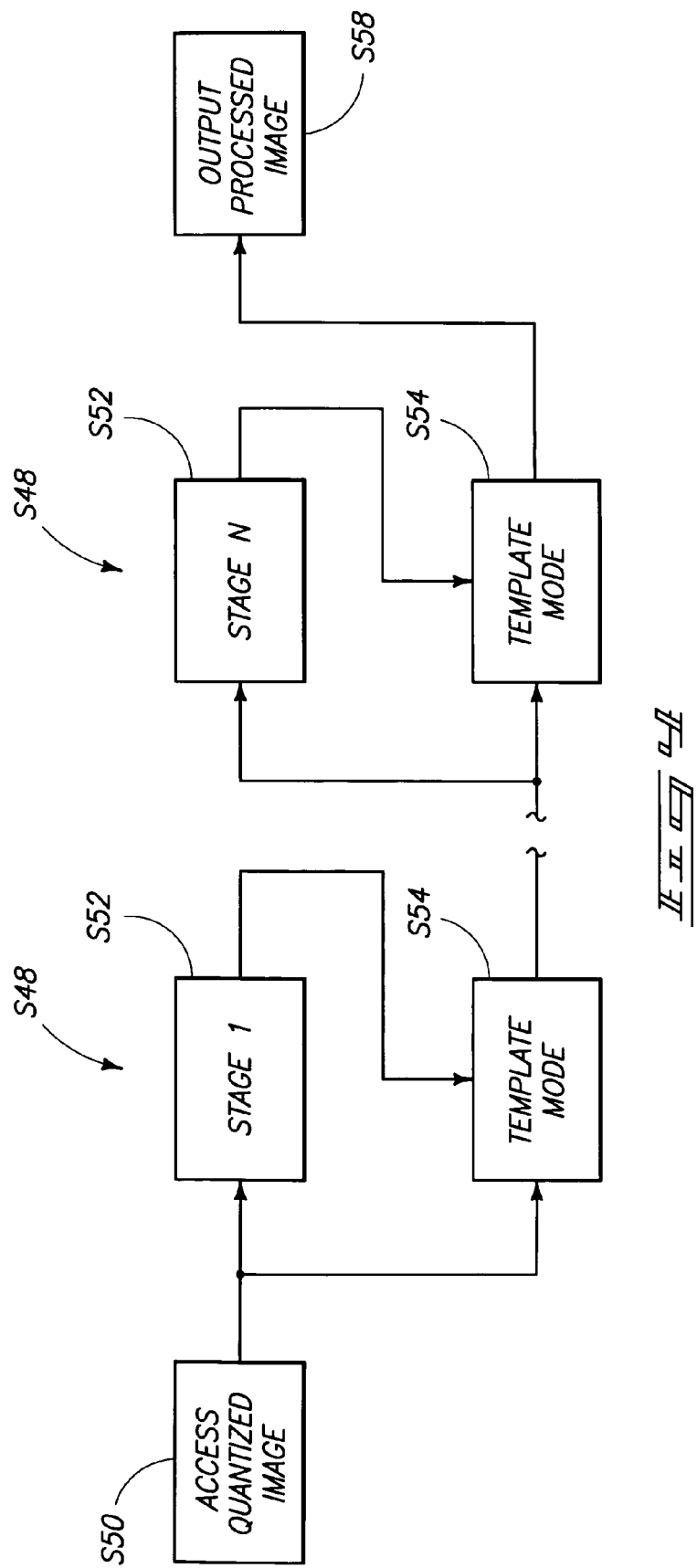
FIG. 4 is a flow diagram of exemplary morphological processing according to one embodiment.

Referring to FIG. 4, an exemplary method including a plurality of levels of morphological processing performed according to one possible embodiment is described. The exemplary morphological processing discussed with respect to FIGS. 4 and 5 accomplishes a series of morphological operations at multiple resolutions allowing spurious colors to be removed from homogeneous color regions in the described embodiment. The method of FIG. 4 filters images morphologically to represent the images as regions/patches individually comprising a single consistent color in the described embodiment. In general, regions are defined wherein a majority of the image forming elements have a consistent or common characteristic (common lexical color name resulting from the lexical quantization) and other inconsistent image forming elements of the region may be changed or filtered to the consistent characteristic. The exemplary method may be performed using processing circuitry 14 in one embodiment. Other methods may include more, less and/or alternative steps in other embodiments.

At a step S50, image data of a lexically quantized image may be accessed by the processing circuitry. An image may be lexically quantized as discussed with respect to step S42 in the above-described embodiment.

The accessed image data may be processed in one or more levels corresponding to one or more steps S48 of respective morphological filter processing resolutions. Individual ones of the morphological processing steps S48 (and corresponding to a different resolution level in the described embodiment) each include a processing stage step S52 and a respective template mode processing step S54. In one embodiment, the respective steps S48 may be parallel symmetrical alternating sequential filters arranged in a pyramid scheme to extract color patches. The respective stages S52 may use structuring elements described below of increasing size to provide multiresolution processing in one embodiment. Initial filtering stages of step S48 may clean up noise in the order of size of the structuring elements used and allowing for following stages to filter out output with a larger structuring element allowing for larger "noise" areas to be removed (e.g., filter areas of inconsistent color of a region).

As mentioned above, steps S48 may also include respective template mode processing steps S54. A modified $mode_{temp-based}(.)$ operator may be used at individual processing steps S54. The operator may be calculated taking into account the image forming elements that lie within areas of disagreement of a particular filtering stage (areas of disagreement discussed below with respect to FIG. 5 may be referred to as a template). Template based mode filtering is done with small structuring elements which may allow for a certain amount of underlying color patch extraction at a relatively small scale. In one embodiment, the template is generated by subtracting the outputs of two parallel symmetrical alternating sequential filters discussed below with respect to FIG. 5 in one embodiment. Areas of agreement may be combined with a union operator with the output of the $mode_{tempbased}(.)$ operator in the template areas (e.g., areas of disagreement). Image forming elements identified as having colors inconsistent with the color of the region may be changed to the color of the region during the filtering. The output processed image at step S58 is a morpho-lexically quantized image comprising a plurality of regions of consistent color (FIG. 2A) in one embodiment. The output processed image at step S58 may or may not include merging of regions mentioned above with respect to step S46 and as described in further detail below.

The pyramid may be composed of as many filtering levels as desired for a given application with structuring elements of increasing size. By starting with a structuring element of relatively small size in the first level, detail regions of an image are preserved. Furthermore, by using a sufficiently large structuring element in stage N of the final level, the largest resulting color patches (if existing in the image) are homogenized to the similar structuring element size.

Figure 5:
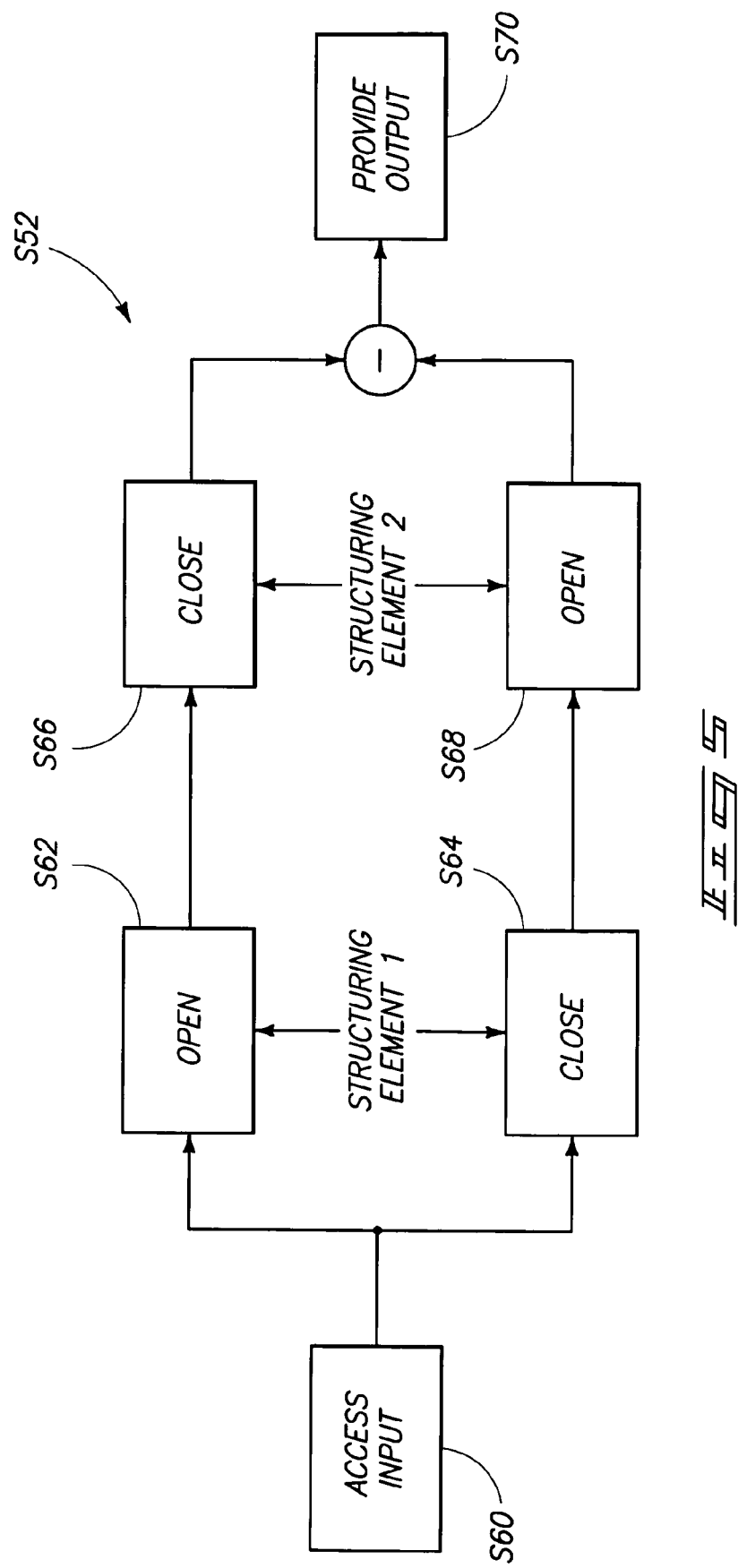
FIG. 5 is a flow diagram of exemplary processing of a stage of FIG. 4 according to one embodiment.

Referring to FIG. 5, an exemplary method performed during processing of a respective step S52 is shown according to one embodiment. Processing circuitry 14 may perform the illustrated method in one embodiment. Other methods are possible including more, less or alternative steps.

At a step S60, the appropriate input image data for the image being processed is accessed. The input image data may be the lexically quantized image of step S42 or a previous level S48 in exemplary embodiments.

An individual processing stage of a step S52 includes parallel symmetrical sequential filters. Plural structuring elements 1, 2 may be used for performing an opening S62 with a larger structuring element followed by a closing S66 with a smaller structuring element in parallel with a dual path (i.e., closing S64 with a larger structure element and an opening S66 with a smaller structuring element). Accordingly, in the described embodiment, the structuring element 2 is less than structuring element 1 for a given level.

The output of both branches is compared and color which is consistent to both filtering branches is maintained. Consistent regions are regions where spurious noise within the region is smaller than the current structuring element. Inconsistent colors may be around region boundaries or where regions had prominent texture at the size or below the current structuring element. The inconsistent regions may be filled in with the above-mentioned mode filtering of the original quantized image taking into account the image forming elements which fall within the inconsistent region which avoids a region growing effect characteristic of a mode filter. In one example using a four level pyramid, the following structuring elements may be used: level 1: 1=disc5, 2=disc3, level 2: 1=disc7, 2=disc5; level 3: 1=disc11, 2=disc7, level 4: 1=disc21, 2=disc11 where discx specifies a circle or diameter of x image forming elements of the given structuring element. The $mode_{tempbased}(.)$ operator of template mode processing of step S54 (FIG. 4) for the respective levels may be set to disc3 in levels 1 and 2 and set to disc5 in levels 3 and 4 in the above-described four level embodiment.

As mentioned above with respect to step S46 of FIG. 3, processing circuitry 14 may merge a plurality of regions identified by the morphological processing. In one example, a portion of an original image may include a significant portion of one color (e.g., blue corresponding to sky) which may fall within different lexical quantization bins, for example, due to a gradient. According to one embodiment, processing circuitry 14 may process identified regions in an attempt to determine whether plural regions should be combined.

In one example, for an individual region, the processing circuitry 14 may analyze the respective subject region with respect to other regions which touch or border the respective subject region, and if certain criteria are met, merge appropriate regions. In the described example, once the regions which border a subject region are identified, the processing circuitry 14 accesses initial image data of the image (e.g., the content of the image data prior to lexical or morphological processing) corresponding to the subject region and the bordering regions and calculates respective average values (e.g., average luminance and chrominance L, a, and b values of an exemplary Lab color space) of the regions using the initial image data. The average values of the subject region may be compared with each of the average values of the respective bordering regions, for example using a Euclidean metric:

$$\text{EuclideanDistance} = \sqrt{(x_1-y_1)^2...(x_n-y_n)^2} \qquad \text{Eqn. 1}$$

where the x values correspond to average L, a, b values of the subject region and the y values correspond to average L, a, b values of the bordering region being analyzed. If the results of Eqn. 1 comparing the subject region with a respective bordering region are below a threshold, then the two regions may be merged with one another. In one embodiment, the threshold may be selected to distinguish between merging of regions which are so similar in the original image that they should be merged (e.g., select the threshold to identify plural similar regions which were near a border between quantization bins) from not merging regions which clearly include content of different colors (e.g., quantization into separate bins did not occur as a result of the color crossing into plural similar quantization bins). The analysis may be repeated for the other regions which border the subject region in one embodiment. The merged regions may represent a single object of the image using a single image region in one embodiment.

Once the regions are identified (and merged if appropriate), the region information including lexical color name, mass and location of each of the regions may be associated with the respective image, for example, as meta data in one embodiment. The region information associated with the images may be used to facilitate management of the images, such as storage and retrieval of images, according to one embodiment. In one embodiment, a representation in the form of a histogram may be generated which includes the region information for each of the regions of an image. In one embodiment, the histogram may be referred to as a morpholexical histogram which may list the regions from larger to smaller in terms of mass.

Exemplary management of images using lexical color names is discussed in the co-pending application incorporated by reference above and filed the same day as the present application. For example as mentioned above, a user may submit commands or requests identifying desired stored images to be retrieved in terms of the human readable lexicon and the image management system 10 may perform operations with respect to the images using the commands or requests and the lexical words associated with the regions of the images. In addition to the color lexical names used in the co-pending application, a user may submit a request for desired images via input 22 using search criteria including characteristics, such as lexical color names, mass and/or location information of one or more regions within the desired images to be retrieved. The request may specify one or more regions of images to be retrieved (e.g., "Locate images having a large blue region center top, a medium red region center, and a yellow region center bottom") and image management system 10 may search images stored in storage circuitry 16 using the search criteria and region information associated with the stored images, and rank the stored images according to how close they match the search criteria. The processing circuitry 14 may create a search representation using the inputted text search request which represents the specified lexical color name, mass and/or location information which may be used to search the stored images. The search representation may be in the form of three vectors corresponding to color, mass and location in one embodiment.

In another exemplary embodiment, the user may present a search image (e.g., photograph) to scanning device 20 (or provide a file using interface 12) and the system 10 may rank stored images according to respective similarities to the scanned photograph. Processing circuitry 14 may create region information of at least one region of the search image to create a search representation and use the search representation to search the stored images using the region information associated with respective ones of the stored images. Other search criteria may be used in other embodiments.

In one embodiment, the processing circuitry 14 may access region information of the stored images and compare the search criteria with respect to the region information of the regions of the stored images in an attempt to identify desired images. The processing circuitry 14 may use the lexical color name, mass and location information to perform comparison operations. For example, the lexical color name, mass and location information may be used to calculate distances of at least one region of the search criteria with respect to a region of each of the stored images. The processing circuitry 14 may be configured to rank the similarity of the search criteria with respect to each of the stored images as a relationship directly proportional to size of the regions, inversely proportional to centroids of the regions, and inversely proportional to the color differences of the regions in one embodiment. For example, for calculating a distance between two images 1 and 2 the following formulae may be used:

$$Dist_{colorPatch_i \to colorPatch_j} = \text{proportionalTo}\left(\frac{centroidDist_{ij} * colorDist_{ij}}{patchSize_i * patchSize_j}\right) \quad \text{Eqn. 2}$$

with $$centroidDist_{ij} = \sqrt{(centroidX_i - centroidX_j)^2 + (centroidY_i - centroidY_j)^2}$$

and $$colorDist_{ij} = \sqrt{(averageL_i - averageL_j)^2 + (averageA_i - averageA_j)^2 + (averageB_i - averageB_j)^2}$$

$$overallDist_{image1 \to image2} = \sum_{i \in image1} \sum_{j \in image2} Dist_{colorPatch_i \to colorPatch_j}$$

Processing circuitry 14 may provide information indicative of similarities of the images being compared responsive to similarities of the regions of the images as indicated by the calculated distances corresponding to the respective regions. For example, the stored images may be ranked from closest (or most similar) to farthest (or most dissimilar) in one implementation. The processing circuitry 14 may depict the search results using display 24 and the user may select desired images for viewing in one embodiment. Initial image data of selected images may be retrieved from the storage circuitry 16 in one embodiment and displayed using display 24.

To facilitate processing of the search representation with respect to the information regarding the stored images, the processing circuitry 14 may initially compare the largest regions of the search representation with respect to the largest regions of the stored images, and subsequently proceed to analyze the regions of smaller size if the larger regions are found to be sufficiently similar.

At least some aspects of the disclosure provide benefits of use of morphological description of images based on consistent color patches. Respective information regarding images may include regional information (color, mass, location) permitting or enhancing capabilities to search for desired images. Furthermore, certain types of images may be characterized by search criteria identifying typical regions of such images (e.g., specifying a blue top region for outdoor images having a sky, specifying a green bottom region for outdoor images of grass or forest, specifying a centered skin tone region for portraits, etc.). Images which more closely resemble the search criteria may be accurately managed using aspects of the disclosure.

Aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The protection sought is not to be limited to the disclosed embodiments, which are given by way of example only, but instead is to be limited only by the scope of the appended claims.

What is claimed is:

1. An image processing method comprising:
   accessing image data of a plurality of images;
   defining a plurality of regions in individual ones of the images, wherein the defining comprises, for each of the images, associating image forming elements of the image with respective lexical color names selected from a set of lexical color names to produce quantized image data, and processing the quantized image data to define each of the regions of image forming elements as respectively having a common characteristic that comprises an association with a consistent one of the lexical color names;
   comparing a given one of the images with respect to one or more other ones of the images based on color distances separating the regions of the given image from respective ones of the regions of the one or more other images, spatial distances between the regions in the given image and the respective regions in the one or more other images, and sizes of the regions in the given image and the respective regions in the one or more other images; and providing information indicative of similarities of the one image relative to the others of the images using results of the comparing wherein the accessing, the defining, the comparing, and the providing are performed by a computing device.

2. The method of claim 1 further comprising, before the comparing, filtering an individual one of the regions to change a characteristic of one of the image forming elements of the individual one region to the common characteristic.

3. The method of claim 1 wherein the comparing comprises comparing distance, color and mass of the region of the one of the images with respect to distance, color and mass of the regions of the others of the images.

4. The method of claim 1 wherein the image data comprises image data for a plurality of image forming elements of the images and wherein the associating comprises associating a plurality of human comprehensible words of a human readable lexicon with respective ones of the image forming elements of the images and indicative of respective characteristics of the image forming elements, and wherein a majority of the image forming elements of an individual one of the regions are associated with the same word corresponding to the same characteristic.

5. The method of claim 4 wherein the words are lexical color names indicative of respective colors of the image forming elements.

6. The method of claim 1 further comprising storing image data of the others of the images using storage circuitry, and wherein the accessing comprises accessing image data of the one of the images after the storing, and wherein the comparing and providing comprise comparing and providing after the storing, and further comprising retrieving one of the others of the images from the storage circuitry after the providing.

7. The method of claim 6 wherein the one of the others of the images has the highest similarity with respect to the one image as determined by the comparing.

8. The method of claim 1 wherein the providing information comprises ranking the similarities of the one image relative to the others of the images.

9. An image management system comprising:

storage circuitry configured to store a plurality of images and to store information regarding a plurality of regions of content of respective ones of the stored images, wherein the information is associated with respective ones of the images and, for each of the images, the information comprises an association of respective ones of the regions of the image with respective lexical color names selected from a set of lexical color names, respective location information, and respective size information; and processing circuitry coupled with the storage circuitry and configured to access search criteria defining one or more regions of a given image and to identify one or more of the stored images based on color distances separating the one or more regions of the given image from respective ones of the regions of the one or more stored images, spatial distances between the one or more regions in the given image and the respective regions in the one or more stored images, and sizes of the one or more regions in the given image and the respective regions in the one or more stored images.

10. The system of claim 9 wherein the processing circuitry is configured to identify the one of the stored images having a region corresponding to a respective one of the regions of the given image.

11. The system of claim 9 wherein the search criteria defines a respective location, a respective mass, and a respective color for each of the one or more defined regions.

12. The system of claim 9 wherein the search criteria defines characteristics of a plurality of regions of the given image to be located.

13. The system of claim 9 wherein the lexical color names comprise human comprehensible words of a human readable lexicon indicative of characteristics of the respective regions, wherein the search criteria comprises at least one of the words regarding the defined region, and wherein the processing circuitry is configured to compare the at least one of the words with respect to the information regarding the regions of the content of the stored images to identify the one or more of the stored images.

14. The system of claim 9 further comprising an input device configured to provide image data regarding a search image, and wherein the processing circuitry is configured to identify at least one region of the search image and to compare the identified at least one region of the search image to the information regarding the regions of content of the stored images to identify the one of the stored images.

15. The system of claim 9 wherein the processing circuitry is configured to lexically quantize the stored images to generate the information comprising lexical color names indicative of colors of the regions.

16. The system of claim 9 wherein the processing circuitry is configured to rank the images indicative of similarities to the search criteria.

17. An article of manufacture comprising:

non-transitory computer readable media comprising programming configured to cause processing circuitry to perform processing comprising:

accessing image data of an image;

lexically quantizing the image data of the image, wherein the lexically quantizing comprises associating image forming elements of the image with respective lexical color names selected from a set of lexical color names;

after the lexically quantizing, processing the quantized image data to define each of a plurality of regions, of the image forming elements as respectively having a common characteristic that comprises an association with a consistent one of the lexical color names; and for a given one of the regions of image forming elements associated with a given one of the lexical color names, changing the lexical color name associated with the image forming elements of a region adjacent the given region to the given lexical color name based on a color distance separating the given region from the adjacent region.

18. The article of claim 17 wherein the associating comprises associating a plurality of human comprehensible words of a human readable lexicon with respective image forming elements of the image and corresponding to characteristics of the image forming elements, and wherein a majority of the image forming elements of the one of the regions are associated with the same word corresponding to the same characteristic before the changing.

19. The article of claim 17 wherein the non-transitory computer readable media comprises programming configured to cause the processing circuitry to perform processing comprising, after the processing the image data to define the plurality of regions, merging one of the regions with another of the regions.

20. The article of claim 17 wherein the non-transitory computer readable media comprises programming configured to cause the processing circuitry to perform processing comprising, after the processing the image data to define the plurality of regions, merging one of the regions with another of the regions using image data corresponding to the one and the another regions which has not been lexically quantized.

21. The article of claim 17 wherein the non-transitory computer readable media comprises programming configured to cause the processing circuitry to perform the processing the image data comprising morphologically processing the image data using a plurality of morphological filters.

22. The article of claim 17 wherein the non-transitory computer readable media comprises programming configured to cause the processing circuitry to perform the processing the image data comprising morphologically processing the image data using a plurality of morphological filters of different resolutions.

* * * * *

UNITED STATES PATENT AND TRADEMARK OFFICE
CERTIFICATE OF CORRECTION

| | | |
|---|---|---|
| PATENT NO. | : 7,848,577 B2 | Page 1 of 1 |
| APPLICATION NO. | : 11/495846 | |
| DATED | : December 7, 2010 | |
| INVENTOR(S) | : Pere Obrador et al. | |

It is certified that error appears in the above-identified patent and that said Letters Patent is hereby corrected as shown below:

In column 12, line 45 (Approx.), in Claim 17, delete "regions," and insert -- regions --, therefor.

Signed and Sealed this
Twenty-seventh Day of March, 2012

David J. Kappos
*Director of the United States Patent and Trademark Office*